United States Patent
Boisson et al.

(10) Patent No.: US 9,113,142 B2
(45) Date of Patent: Aug. 18, 2015

(54) METHOD AND DEVICE FOR PROVIDING TEMPORALLY CONSISTENT DISPARITY ESTIMATIONS

(75) Inventors: Guillaume Boisson, Cesson Sevigne (FR); Paul Kerbiriou, Cesson Sevigne Cedex (FR); Valter Drazic, Cesson Sevigne Cedex (FR)

(73) Assignee: THOMSON LICENSING, Issy les Moulineaux (FR)

(*) Notice: Subject to any disclaimer, the term of this patent is extended or adjusted under 35 U.S.C. 154(b) by 330 days.

(21) Appl. No.: 13/399,036

(22) Filed: Feb. 17, 2012

(65) Prior Publication Data

US 2013/0176388 A1 Jul. 11, 2013

(30) Foreign Application Priority Data

Jan. 6, 2012 (EP) .................................... 12305019

(51) Int. Cl.
*H04N 13/00* (2006.01)
*H04N 13/02* (2006.01)

(52) U.S. Cl.
CPC ....... *H04N 13/0018* (2013.01); *H04N 13/0022* (2013.01); *H04N 13/0239* (2013.01)

(58) Field of Classification Search
CPC .............. H04N 13/00; H04N 13/0022; H04N 13/0271; G06T 2207/20228
USPC .................................. 348/43, 39; 375/240.16
See application file for complete search history.

(56) References Cited

U.S. PATENT DOCUMENTS

| 2004/0165765 | A1 | 8/2004 | Sung et al. | |
| 2006/0285595 | A1* | 12/2006 | Ha et al. | 375/240.16 |
| 2007/0064800 | A1 | 3/2007 | Ha | |
| 2012/0120202 | A1* | 5/2012 | Yoon et al. | 348/49 |

FOREIGN PATENT DOCUMENTS

| EP | 1784022 | 5/2007 |
| WO | WO2011006781 | 1/2011 |

* cited by examiner

*Primary Examiner* — Gims Philippe
*Assistant Examiner* — Benjamin Pezzner
(74) *Attorney, Agent, or Firm* — Tutunjian & Bitetto, P.C.

(57) ABSTRACT

The invention relates to three dimensional video imaging, in which at least a left view and a right view of a moving scene are produced and a map of disparities is produced for all pixels of the successive images of a video sequence.

14 Claims, 3 Drawing Sheets

METHOD AND DEVICE FOR PROVIDING TEMPORALLY CONSISTENT DISPARITY ESTIMATIONS

This application claims the benefit, under 35 U.S.C. §119 of EP Patent Application 12305019.7, filed 6 Jan. 2012.

FIELD OF THE INVENTION

The invention relates to three dimensional video imaging, in which at least a left view and a right view of a moving scene are produced and a map of disparities is produced for all pixels of the successive images of a video sequence. The purpose of the invention is to provide an improved manner of associating disparities to successive images.

BACKGROUND OF THE INVENTION

Disparity is a geometrical quantity associated with each point of a two-dimensional image to reflect a depth of the point of the scene in a three-dimensional representation.

If one considers an object-point observed by a left camera and a right camera which produce respectively a left image and a right image, the disparity is the difference between the position of this object-point in the left image and in the right image. It depends directly from the "depth" of the object-point, i.e. its distance to the cameras.

Disparity is expressed in an integer and fractional number of pixels. For images taken by two cameras having their axes converging in a plane at a distance $z_{conv}$ in meters from the cameras, the cameras having an inter-axis B in meters and having a focal distance F expressed in a number of pixels, disparity d is:

$$d = F \cdot B \cdot [(1/z_{conv}) - (1/z)]$$

where z is the distance (or depth), in meters, from the cameras to the observed point.

Conventionally, disparities are negative for objects placed between the cameras and the convergence plane, zero if they are in the convergence plane, and positive if they are situated beyond this plane. If the cameras are parallel, disparities are negative; they tend towards zero at an infinite distance.

In a video sequence of images to be viewed in three dimensions, successive maps of disparities may be built from successive pairs of images produced by the two cameras; each map has one disparity value for each pixel of the image. As a matter of fact even two maps may be built for each pair: one reflects the disparity of the right image with respect to the left image, the other reflects the disparities of the left image with respect to the right image. During one single frame time of the video sequence, a computer analyses the images, and derives, from the discrepancies between the two images of the pair, a disparity value for each pixel. The computer tries to find in one image a destination pixel which corresponds to a given pixel in the other image, i.e. it finds the pixel of the second image (for instance the right image) which most presumably represents the same object as the given pixel in the first image (the left image). The computer does it for every single pixel and builds a map of disparities which has as many pixels as the images and in which the weight or amplitude for each pixel is the disparity of the pixel.

The disparity map is attached to a pair of images and will be used for restitution on a stereoscopic or auto-stereoscopic display.

The computation of disparities is not an exact and secure computation. Rather, it is an estimation. The reason is that it may be difficult to know exactly what is the destination pixel for a given pixel. It often happens that several pixels may be the destination pixel for a given pixel. The estimation is generally made by correlation of portions of images and the solution which is provided by the computer for each pixel is the solution that provides a maximum of likelihood, but there is no absolute certainty in it.

For instance, if the observed scene comprises a well characterized zone such as a square or a circle with very neat contours, the estimator will easily do the correlation between this shape in the left image and the same shape in the right image. However, for more complex portions of images, such as images with rather uniformly colored zones and no precise contour, it is much more difficult and the estimator will not be able to precisely determine what point corresponds to what point.

The error in disparity computation will not be so annoying if the images are static. The image seen in three dimensions may have false evaluations of depth but the viewer will see it without discomfort. It is much more annoying in a video sequence because the computer will do the estimation for each pair of images but may arrive to different estimations in different pairs of images even though the depth of the object in the real scene has not changed from a pair to the next successive pairs.

This variation in the estimations from image to image will result, at the time of reproduction on a display, in artifacts such as flickering or jittering, false colors, etc. They are uncomfortable for the viewer.

SUMMARY OF THE INVENTION

The invention aims at reducing at least in part this discomfort due to undesirable artifacts.

To attain this purpose, the invention proposes a method for providing a disparity map of values in a sequence of pairs of images, each pair of images comprising a first image and a second image, the method comprising the steps of cyclically:

detecting still zones in a current image by comparison of the first image of a current pair and the first image of a previous pair,
  providing current disparity estimations for a current pair of images, from an estimation process based on the current pair of images, at least for pixels that do not belong to a still zone,
  assigning current disparity values from the estimation process for pixels of the first image of the current pair that do not belong to a still zone,
  assigning a modified disparity value to a pixel which belongs to a still zone.

In other words, the estimation process does not assign the currently estimated value to a pixel that belongs to a still zone. Rather, it forces the disparity value to a modified value. The modified value is chosen so as to provide a map of disparities which will be more stable in time, even though possibly inexact. The still zones, or invariant zones are portions of image that do not vary between the said two first images.

Preferably, the modified disparity value assigned to such a pixel of a still zone is derived from a respective previous disparity value estimated or assigned to the same pixel in the previous pair.

In a simplified version, the modified disparity value is the same disparity value that has been assigned to the pixel in the assignment process for the previous pair of images, i.e. the previous disparity value is simply propagated instead of being replaced by a newly estimated value.

The modified disparity value may also be an average of the disparity values assigned to the pixel in several previous first images, and, in that case, the detecting step requires that the still zone be still in all several previous first images.

The modified disparity value may also be a median value of the disparity values assigned to the pixel in several previous first images.

Additionally, the method of providing a disparity map of values may comprise also a checking operation based on coherency of still zones in the first and second images of the pair.

Thus the method preferably further comprises a comparison of the second image of the current pair and the second image of a previous pair, a finding of still zones in the second image, and a checking operation after the providing of disparity estimations. In that case, the providing of disparity estimations will comprise providing a disparity estimation also for the pixels belonging to a still zone, in the first image as well as in the second image. And the checking operation will comprise:

determining destination pixels of the second image of the current pair, corresponding to respective pixels of the still zones of the first image, shifted by the disparity estimations of these respective pixels, and discarding from the still zones of the first image those pixels of the first image that have a destination pixel which is not in a still zone of the second image.

Preferably, the reverse discarding is done also, i.e. discarding from the still zone of the second image those pixels of the second image that have a destination pixel which is not in a still zone of the first image.

Thus, the definition of the pixels of a still zone will be more secure in that the still zone must be still in the first image (or sequence of several first images) and must have a corresponding destination portion in the second image (or sequence of several second images) which is still as well.

Finally, the detecting step for detecting still zones preferably comprises:

subtracting, pixel by pixel, the luminance values in the first image of the previous pair from the corresponding luminance values in the first image of the current pair, so as to produce a difference image, operating a bilateral filtering on the pixels of the difference image to build a filtered difference image, and determining the still zones as those areas of the filtered difference image that comprise only pixels of zero value.

By "zero value" is meant a value below a threshold which is at most equal to the acquisition noise of the images. The bilateral filtering will lower the noise in the image so that the still zones will have luminances very close to zero.

Bilateral filtering as understood here is a filtering that assigns to a given pixel a combination of the luminances of the pixel and of neighboring pixels, with coefficients that depend both from the distance of a neighboring pixel to the considered pixel (the lower the distance, the higher the coefficient) and from the difference of luminance values between the neighboring pixel and the considered pixel (the lower the difference, the higher the coefficient). Luminance as understood for the purpose of this bilateral filtering is a difference of luminances between a current image and a previous image, since the filtering is operated on a difference of images not on the images themselves.

In addition to the method thus summarized, the invention also proposes a device for providing a disparity map of values in a sequence of pairs of images, each pair of image comprising a first image and a second image, the device comprising means for receiving a succession of pair of images, and:

means for detecting still zones of a current image by comparison of the first image of a current pair and the first image of a previous pair, means for providing current disparity estimations for a current pair of images from an estimation process based on the current pair of images, at least for pixels that do not belong to a still zone, means for assigning current disparity values from the estimation process for pixels of the first image of the current pair that do not belong to a still zone, means for assigning a modified disparity value to a pixel of the first image if it belongs to a still zone.

The means for detecting still zones preferably comprise:

means for subtracting, pixel by pixel, the luminance values in the first image of the previous pair from the corresponding luminance values in the first image of the current pair, so as to produce a difference image, means for bilateral filtering of the difference image to build a filtered difference image, and means for determining the still zones as those areas of the filtered difference image that comprise only pixels of zero value.

BRIEF DESCRIPTION OF DRAWINGS

Other features and advantages of the invention will appear upon reading the following detailed description made in reference to the attached drawings in which.

DETAILED DESCRIPTION OF PREFERRED EMBODIMENTS

Figure 1:
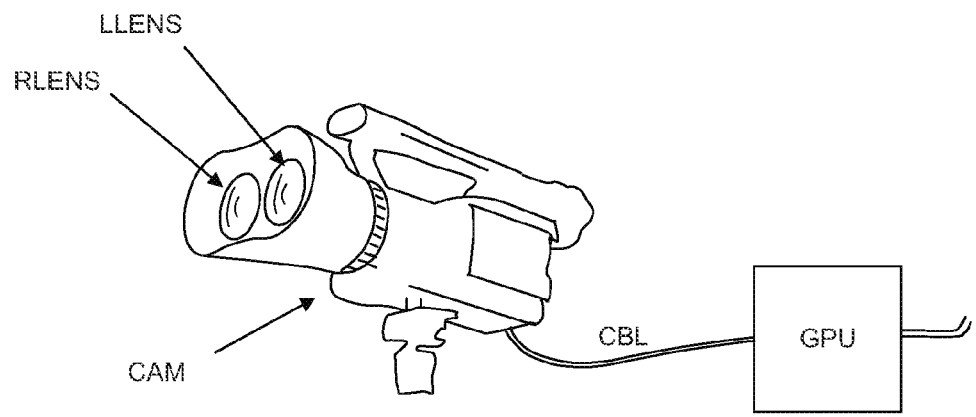
FIG. 1 represents a camera for 3D video recording.

FIG. 1 shows a camera CAM for three dimensional video recording. The camera has two lenses LLENS (left lens) and RLENS (right lens). A respective electronic matrix image sensor is coupled to each lens so as to produce two images for each frame. The images may be recorded on a recording support (not shown, inserted in the camera body) in view of being processed later in processing means, or they may be sent through cable means CBL or wireless communicating means (not shown) for processing. The processing means includes means for estimating disparities. They may be incorporated in the camera and then the camera records or sends not only the images but also a map of disparities. The processing means may alternatively be external to the camera. The processing means may be a graphics processing unit in a computer or in a video display. For the sake of simplicity, the processing means have been represented on FIG. 1 as a box GPU, external to the bi-lens camera and linked to the camera through cable CBL.

Figure 2:
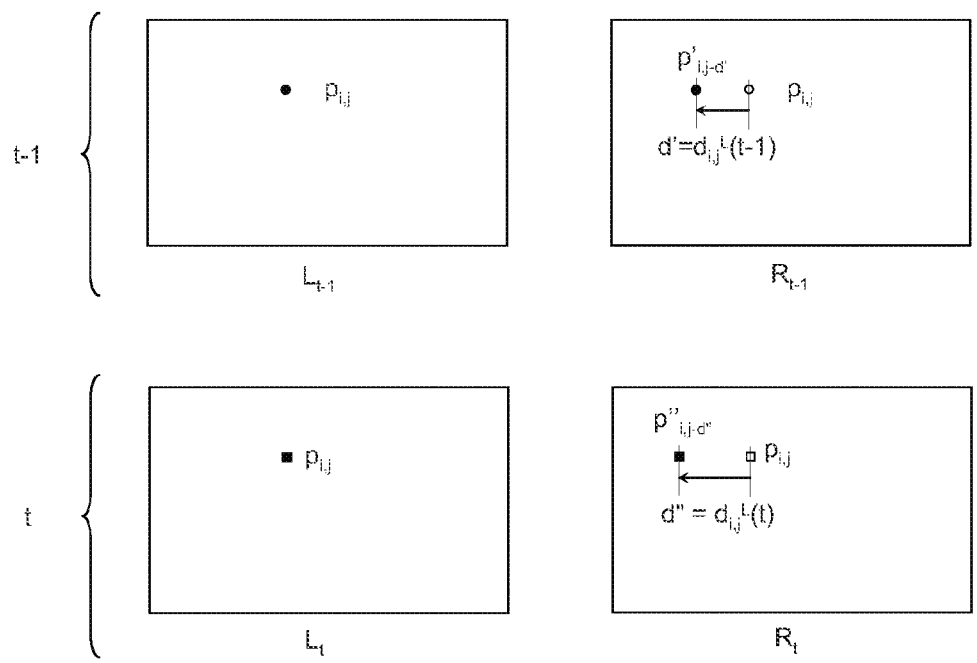
FIG. 2 represents a schematic diagram explaining the notion of disparity in a sequence of a previous pair of images and a current pair of images.

On FIG. 2 there is schematically represented two pairs of successive images of a video sequence taken by two cameras (or a camera having two lenses and two electronic sensors) observing a scene. The first pair of images is taken at a time t−1 which will referred to as the previous instant; it comprises a left image $L_{t-1}$ (which will be conventionally considered as the first image) and a right image $R_{t-1}$ (the second image of the pair). The second pair is taken at a time t which will be referred to as the current instant; it comprises left image $L_t$ and right image $R_t$. The discrete unit time interval between times t−1 and t is a frame time in a video sequence.

One pixel $p_{i,j}$ has been represented in left image $L_{t-1}$. Letter i designates the rank of the pixel among n lines of pixels and letter j designates the rank of the pixel among m columns of pixels.

An estimation of disparity based on the pair of images and a correlation process on portions of the images will identify one point in image $R_{t-1}$ which should most probably correspond to a given point in image $L_{t-1}$; this means that these two points represent the same object or portion of object in the scene observed by two cameras which have simultaneously produced the left and right images. However, the corresponding point is not at the same position in the right image when the observed point is not in the convergence plane of the cameras. It is shifted (in this case: towards the left) by an amount which is the disparity of the point, directly linked to the distance of the object to the cameras.

If we start from a pixel $p_{i,j}$ in the left image at time t−1, the estimation will lead to a disparity $d_{i,j}^L(t-1)$ and the position of the corresponding pixel in the right image $R_{t-1}$ will be horizontally shifted by a distance $d_{i,j}^L(t-1)$ with respect to position of coordinates i,j. The L symbol here means that the disparity which is computed starts from points in the left image to reach destination points in the right image.

For the sake of simplicity, we will assume that the disparity is an integer number of pixels so that the destination pixel in the right image will be another pixel. The disparity may however have a fractional part and the fractional part will be dealt with by interpolation processes when restituting a stereo image.

On FIG. 2, the destination pixel, shifted by a disparity $d'=d_{i,j}^L(t-1)$ is denoted $p'_{i,j-d}$ to express the fact that the disparity is in principle horizontal and the horizontal shift in coordinates is by a distance d.

In a video sequence, the next pair of images, taken at time t, also comprise a left image $L_t$ and a right image $R_t$.

If we consider the same position (i,j) of a pixel in the left image, the disparity estimator will again compute a disparity to find out which pixel $p''_{i,j-d''}$ in the right image $R_t$ corresponds to the same object as the pixel of position i,j in the left image $L_t$. Disparity is now $d''=d_{i,j}^L(t)$, which may not be the same as disparity $d'=d_{i,j}^L(t-1)$ for at least two reasons:

the pixel at position i,j at time t may correspond to another object in the image than pixel at position i,j at time t−1; the other object may be at a different distance from the cameras and thus may have a different disparity;

disparity is obtained by an estimation which depends from the surroundings of the pixel at position i,j; in some instances such as a uniformly colored zone the estimated disparity may be wrong because the pixel is surrounded by pixels having the same luminance and chrominance values so that many pixels in the right image could "correspond" to one pixel in the left image; the computer might select a different corresponding point in the computation at time t than at time t−1 even though nothing has changed in the image.

Upon use of the map of disparities, for instance in a stereoscopic display or auto-stereoscopic display, such uniform zones will experience unstable disparity estimations from frame to frame even though the real disparity should not vary because the concerned pixels do not change their "depth" in the image, i.e. their distance to the camera in the observed scene.

Those unstable disparity estimations will lead to flickering or false colors, or other artifacts, all unpleasant for the viewer.

Figure 3:
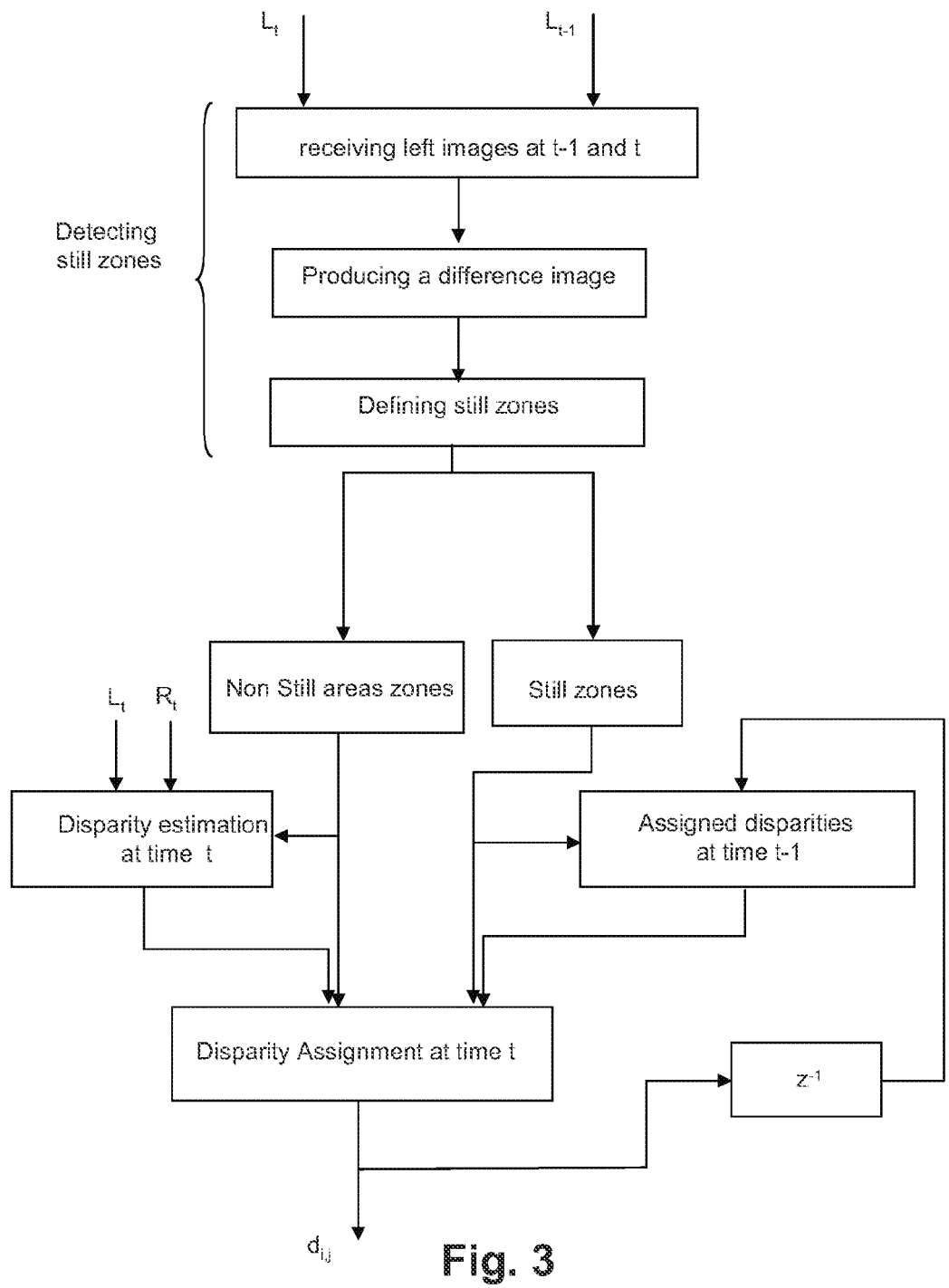
FIG. 3 represents a diagram of the main steps of the invention.

A partial solution to this problem is provided by the invention by using the following basic steps summarized in the diagram of FIG. 3:

a) Detecting Still Zones:

In one image (for instance the left image), zones comprising invariant pixels in image $L_{t-1}$ at time t−1 and in image $L_t$ at time t, are detected; for that purpose; a difference image, which is the difference pixel by pixel between the two images, is produced; zones where the difference is zero or very near zero are considered as still zones for the purpose of this method; a threshold may be established to define the still zones as the zones where the differences (in absolute value) between two corresponding pixels of the successive images are below the threshold.

However, it is difficult to define which threshold is best appropriate, because the threshold will depend from the acquisition noise. Therefore, preferably, a bilateral filtering will be provided on the difference image to produce a filtered difference image in which noise is largely removed, prior to comparing with a threshold close to zero.

Bilateral filtering is done by replacing the luminance value of each pixel of the difference image by a linear combination of the amplitude of luminance of a pixel and the neighboring pixels, for instance the pixels in a square of 16 or 64 pixels around the considered pixel. The coefficients of the linear combination depends from the distance between the considered pixel and a neighboring pixel; the farther the pixel, the less the coefficient; thus the luminance of a pixel is more influenced by the pixels that are closer than by the pixels that are farther. The coefficients also depend from the difference (in absolute value) of luminances between the considered pixel and the neighboring pixel; the higher the difference, the less the coefficient; thus the luminance of a pixel is more influenced by pixels that have a similar luminance than by pixels that have a significant difference of luminances. It should be understood that the luminance of a pixel here is a difference of luminances between two images, since filtering is done on the difference image, not on the original images.

There are less artifacts, less noise, in the filtered difference image than in the original difference image. It is then easier to define a threshold for distinguishing a still zone from a non-still zone. The threshold may be equal to zero when the acquisition noise is low.

b) Estimating Disparities:

Disparity at time t is estimated, based on the current pair of images $L_t$, $R_t$, for each pixel, at least for pixels that do not belong to a still zone, and possibly also for pixels which belong to a still zone;

c) Assigning Disparities:

Disparity values are assigned to all pixels of the current pair of images in the following way:

for a pixel that does not belong to a still zone, the estimated disparity is assigned to the pixel, for a pixel that belongs to a still zone, a modified disparity value is assigned; the modified value is derived from a previous disparity value estimated or assigned to a corresponding pixel of the first image of the previous pair.

In FIG. 3, block $z^{-1}$ is intended to symbolically mean that a previous disparity assignment is used in the process. The modified disparity value assigned to a pixel in a still zone may be precisely the disparity previously assigned to this pixel. However as indicated below it may be different.

The map of disparities associated with the current pair of images thus comprises pixels having disparities estimated from the content of the current pair of images, and disparities estimated from at least one previously computed disparity.

For still zones, the disparity value will be more or less propagated from a pair of images to the next pair of images instead of being independently recomputed for each pair. The disparity may be wrong if the estimation was poor. But it will be stable and this will partly remove artifacts.

Instead of being precisely the previously assigned disparity, the currently assigned disparity may also be a mean value, or alternatively a median value, of several disparities obtained for the considered pixel in a number of previous images.

If the assigned disparity value for a still zone is a mean or median disparity estimated over several previous images it will be necessary to check that the identified still zone was still all along the several previous images. For that purpose, successive difference images (preferably filtered difference images) will be produced, each from subtracting a previous image from a current image and filtering the result, and the filtered differences will be compared together; the still zones will be defined as zones where the differences are zero in the successive comparisons, for instance over 4, 8, or 16 images.

To make the process more secure and more coherent between left and right images, it is preferable that the definition of still zones uses both images of each pair, i.e. not only two successive left images but also two successive right images.

Coherency is preferably provided in the following way: the pixels of a still zone of the left image will have corresponding pixels (shifted by the estimated disparity values) in the right image. These corresponding pixels, or destination pixels, should also be in a still zone as seen from the succession of right images. The method then comprises the following checking operation:

- detecting still zones in the succession of right images (in addition to the detection of still zones in the succession of left images),
- determining destination pixels of the right image of the current pair, derived from respective pixels of the still zones of the left image, shifted by the disparity estimations of these respective pixels,
- and discarding from the still zone those pixels of the left image that have a destination pixel which is not in a still zone of the right image.

Thus, the definition of the pixels of a still zone will be more secure in that the still zone will have to be still not only in two (or more) successive left views but also in corresponding destination portions of two (or more) right views.

Figure 4:
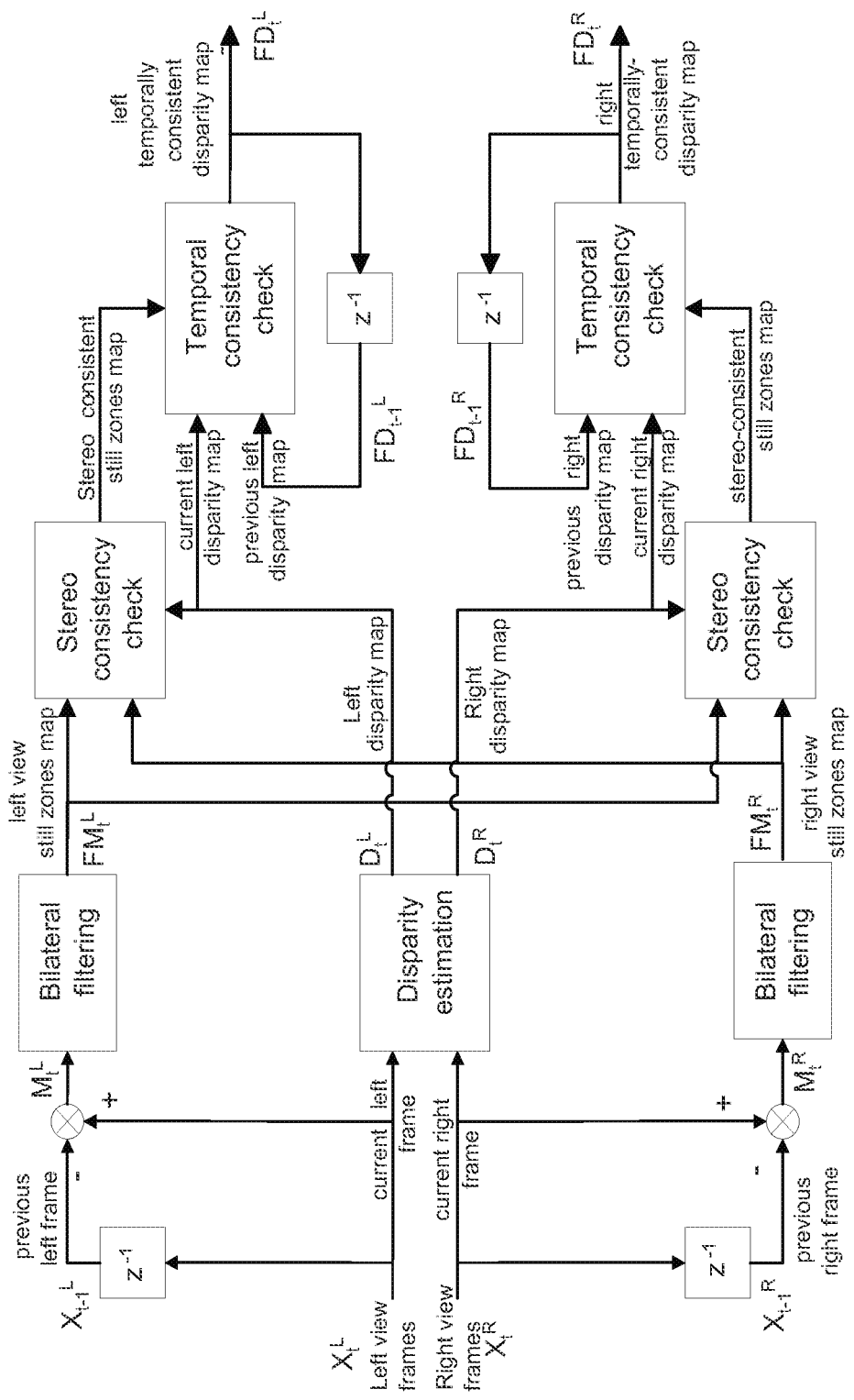
FIG. 4 represents an overall workflow diagram in a case where coherency of determination of still zones is insured.

The overall workflow of the process according to a preferred embodiment of the invention is described in relation to FIG. 4, using the following notations:

i,j are the coordinates of a pixel $p_{i,j}$ at the intersection of a line of rank i among n lines, and a column of rank j among m columns; i varies between 0 and n−1 if the image has n lines; j varies between 0 and m−1 if the image has m columns;

Index t denotes the time of a current pair of frames; t−1 denotes the time of the previous pair; thus time t is a discrete variable and the increment of time is the period of successive frames;

$X_t^L$ and $X_{t-1}^L$ are the left frames at time t and t−1, $X_t^R$ and $X_{t-1}^R$ are the right frames; $M_t^L$ is a map or "difference image" representing pixel by pixel the difference between successive left frames at time t and time t−1; thus $M_t^L = X_t^L - X_{t-1}^L$. For more detailed notations, $X_t^L[i,j]$ is the luminance of pixel $p_{i,j}$ in the left frame at time t and $M_t^L[i,j]$ is the difference between the luminances of pixel $p_{i,j}$ at time t and t−1. Similarly, $X_t^R[i,j]$ is the luminance of pixel $p_{i,j}$ in the right frame at time t and $M_t^R[i,j]$ is the difference in luminances for a pixel $p_{i,j}$ of the right frames.

Thus $$\forall (i,j) \in [0, n-1], [0, m-1] \begin{cases} M_t^L[i,j] = X_t^L[i,j] - X_{t-1}^L[i,j] \\ M_t^R[i,j] = X_t^R[i,j] - X_{t-1}^R[i,j] \end{cases}$$

On FIG. 4, the symbol $z^{-1}$ is used as a classical symbolical representation (in the mathematics of sampled systems) of a delay function by one sample. Thus, where the input of box $z^{-1}$ is a current image such as $X_t^L$, the output of box $z^{-1}$ is the stored previous image $X_{t-1}^L$.

Difference maps $M_t^L$ and $M_t^R$ are generated independently for left and right views by subtracting pixel by pixel the previous frame to the current frame.

The $Mt^L$ and $M_t^R$ difference images then present large values (and variations) only at the location of moving objects and in their drag. In still zones, $M_t^L$ and $M_t^R$ images present much lower energy but are not fully zero zones because of the temporal acquisition noise in the process of acquisition of images.

In order to refine these initial difference images into large continuous areas of zero value, the difference images $M_t^L[i,j]$ and $M_t^R[i,j]$ are processed with bilateral filtering. Each pixel $p_{i,j}$ of the difference images is replaced by a linear combination of all pixels of a block surrounding the considered pixel, the coefficients depending from the proximity and relative values of the surrounding pixels. The noise is considerably reduced and a low threshold or zero threshold of the absolute value of the pixels of the difference images will be sufficient to determine which areas are still areas.

The bilateral filtered difference images are denoted $FM_t^L$ and $FM_t^R$. The zones where pixels have a value of zero or a value below a specified threshold are defined as the still zones.

While still zones are thus defined, disparity estimation is effected in parallel, based on the content of the frame at current time t. In this case, disparity estimation is done for all pixels of the left frame and for all pixels of the right frame. The disparity map estimated from the left image at time t is $D_t^L$.

Similarly, disparity is estimated for all pixels of the right image to find what are the destination pixels in the left image that correspond to original pixels in the right image. The disparity map estimated from the right image is denoted $D_t^R$.

A double checking operation is preferably effected, based on disparity estimations, to check for consistency of the still zones in the left image and the right image. The checking is as follows for all pixels of the filtered difference images $FM_t^L$ and $FM_t^R$:

if a pixel $p_{i,j}$ has a zero amplitude (meaning an amplitude below a threshold) in filtered difference image $FM_t^L$ it is considered as belonging to a still zone; this pixel has a destination pixel in the right image, at a position $i, j+d_j^L[i,j]$, i.e. it is shifted by the left disparity value $d_j^L[i,j]$; if the destination pixel does not belong to a still zone of filtered difference image $FM_t^R$, then the pixel is not considered as belonging to a still zone and it is discarded from the filtered difference image; a left view stereo-consistent still zone map is built by removing such pixels from the still zones of map $FM_t^L$;

similarly, if a pixel $p_{i,j}$ has a zero amplitude (meaning an amplitude below a threshold) in filtered difference image $FM_t^R$ it is considered as belonging to a still zone; this pixel has a destination pixel in the left image, at a position $i, j+d_j^R[i,j]$, shifted by the right disparity value $d_j^R[i,j]$; if the destination pixel does not belong to a still zone of filtered difference image $FM_t^L$, then the pixel is not considered as belonging to a still zone and it is discarded from the filtered difference image; a right view stereo-consistent still zone map is built by removing such pixels from the still zones of map $FM_t^R$.

Once still zones of images $FM_t^L$ and $FM_t^R$ have been defined with stereo-consistency by this removal of certain pixels, two final disparity maps (left and right) $FD_t^L$ and $FD_t^R$ will be produced by assigning the disparities of disparity map $D_t^L$ to all pixels of the left image that do not belong to a stereo-consistent still zone;

assigning the disparities of disparity map $D_t^R$ to all pixels of the right image that do not belong to a stereo-consistent still zone;

for pixels that belong to a left view stereo-consistent still zone, assigning the final disparities of the previous final disparity map $FD_{t-1}^L$;

for pixels that belong to a right view stereo-consistent still zone, assigning the final disparities of the previous final disparity map $FD_{t-1}^R$;

Thus, for the still zones, the disparities are propagated from a frame to the next frame even though the estimator has found different disparities in the two successive frames.

The invention claimed is:

1. A method for providing a disparity map of values in a sequence of pairs of images, each pair of images comprising a first image ($L_t$) and a second image ($R_t$), the method comprising cyclically:
   detecting still zones in a current image by comparison of the first image ($L_t$) of a current pair and the first image ($L_{t-1}$) of a previous pair,
   providing current disparity estimations ($D_t^L$) for a current pair of images, from an estimation process based on the current pair of images, at least for pixels that do not belong to a still zone,
   assigning current disparity values from the estimation process for pixels of the first image of the current pair that do not belong to a still zone,
   assigning a modified disparity value ($FD_{t-1}^L$) to a pixel which belongs to a still zone, and
   checking coherency of still zones in the current pair, comprising:
      determining still zones in a second image of the current pair;
      determining destination pixels of the second image of the current pair, said destination pixels corresponding to respective pixels of the still zones of the first image of the current pair shifted by the disparity estimations of the respective pixels, and
      discarding from the still zones of the first image of the current pair those pixels that have a destination pixel which is not in a still zone of the second image of the current pair.

2. The method according to claim 1, wherein the modified disparity value assigned to such a pixel of a still zone is derived from a respective previous disparity value estimated or assigned to the same pixel in the previous pair.

3. The method according to claim 2, wherein the modified disparity value is the disparity value assigned to the pixel in the assignment process for the previous pair of images.

4. The method according to claim 2, wherein the modified disparity value is an average of the disparity values assigned to the pixel in several previous first images.

5. The method according to claim 2, wherein the modified disparity value is a median value of the disparity values assigned to the pixel in several previous first images.

6. The method according to claim 1, wherein the checking operation further comprises:
   determining destination pixels of the first image of the current pair, corresponding to respective pixels of the still zones of the second image, shifted by the disparity estimations of these respective pixels,
   and discarding from the still zones of the second image those pixels of the second image that have a destination pixel which is not in a still zone of the first image.

7. The method according to claim 1, wherein the detecting step for detecting still zones preferably comprises:
   subtracting, pixel by pixel, luminance values in the first image ($L_{t-1}$) of the previous pair from corresponding luminance values in the first image ($L_t$) of the current pair, so as to produce a difference image ($M_t^L$),
   operating a bilateral filtering on the pixels of the difference image to build a filtered difference image ($FM_t^L$), and
   determining the still zones as those areas of the filtered difference image that comprise only pixels of zero value.

8. A device for providing a disparity map of values in a sequence of pairs of images, each pair of images comprising a first image ($L_t$) and a second image ($R_t$), the device comprising a receiver configured to receive a succession of pair of images, and a processor configured to:
   detect still zones of a current image by comparison of the first image and second images ($L_t$) of a current pair and the first image ($L_{t-1}$) of a previous pair,
   estimate current disparity for a current pair of images from an estimation process based on the current pair of images, at least for pixels that do not belong to a still zone,
   assign current disparity values from the estimation process for pixels of the first image of the current pair that do not belong to a still zone,
   assign a modified disparity value to a pixel of the first image if it belongs to a still zone, and
   check coherency of still zones in the current pair by:
      determining still zones in a second image of the current pair;
      determining destination pixels of a second image of the current pair, said destination pixels of the second image of the current pair corresponding to respective pixels of the still zones of the first image of the current pair shifted by the disparity estimations of the respective pixels, and
      discarding from the still zones of the first image of the current pair those pixels that have a destination pixel which is not in a still zone of the second image of the current pair.

9. The device according to claim 8, wherein the processor is further configured to detect still zones by:
   subtracting, pixel by pixel, luminance values in the first image ($L_{t-1}$) of the previous pair from corresponding luminance values in the first image ($L_t$) of the current pair, so as to produce a difference image ($M_t^L$),
   bilaterally filtering the difference image to build a filtered difference image ($FM_t^L$), and
   determining the still zones as those areas of the filtered difference image that comprise only pixels of zero value.

10. The device according to claim 8, wherein the modified disparity value assigned to such a pixel of a still zone is derived from a respective previous disparity value estimated or assigned to the same pixel in the previous pair.

11. The device according to claim 10, wherein the modified disparity value is the disparity value assigned to the pixel in the assignment process for the previous pair of images.

12. The device according to claim 11, wherein the modified disparity value is an average of the disparity values assigned to the pixel in several previous first images.

13. The device according to claim 10, wherein the modified disparity value is a median value of the disparity values assigned to the pixel in several previous first images.

14. The device according to claim 8, wherein the processor is further configured to check coherency of still zones by:
- determining destination pixels of the first image of the current pair, corresponding to respective pixels of the still zones of the second image, shifted by the disparity estimations of these respective pixels, and
- discarding from the still zones of the second image those pixels of the second image that have a destination pixel which is not in a still zone of the first image.

* * * * *